US011077857B2

(12) United States Patent
An et al.

(10) Patent No.: US 11,077,857 B2
(45) Date of Patent: Aug. 3, 2021

(54) DEVICE AND METHOD FOR CONTROLLING ALCOHOL INTERLOCK

(71) Applicants: HYUNDAI MOTOR COMPANY, Seoul (KR); KIA MOTORS CORPORATION, Seoul (KR)

(72) Inventors: Dae Yun An, Anyang-si (KR); Gyun Ha Kim, Incheon (KR); Eung Hwan Kim, Seoul (KR); Sang Kyung Seo, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/837,151

(22) Filed: Apr. 1, 2020

(65) Prior Publication Data
US 2021/0171045 A1    Jun. 10, 2021

(30) Foreign Application Priority Data

Dec. 10, 2019  (KR) .......................... 10-2019-0164179

(51) Int. Cl.
  *B60K 28/02*  (2006.01)
  *B60W 40/08*  (2012.01)
(52) U.S. Cl.
  CPC ..... *B60W 40/08* (2013.01); *B60W 2040/0836* (2013.01); *B60W 2040/0881* (2013.01); *B60W 2540/01* (2020.02); *B60W 2540/221* (2020.02); *B60W 2540/24* (2013.01)
(58) Field of Classification Search
  CPC ........... B60W 40/08; B60W 2540/221; B60W 2040/0836; B60W 2540/01; B60W 2540/24; B60W 2040/0881; B60K 28/063; G05B 11/00; H04K 3/415; H04K 2203/16

See application file for complete search history.

(56) References Cited

U.S. PATENT DOCUMENTS

| | | | | |
|---|---|---|---|---|
| 2003/0109795 | A1* | 6/2003 | Webber ................ | A61B 5/0836 600/543 |
| 2011/0292209 | A1* | 12/2011 | Morley ................ | B60K 28/063 348/148 |
| 2012/0055726 | A1* | 3/2012 | Hannon ................ | B60W 40/08 180/272 |
| 2012/0228047 | A1* | 9/2012 | White .................. | B60K 28/063 180/272 |
| 2013/0168175 | A1* | 7/2013 | Polzius .............. | A61B 10/0045 180/272 |

(Continued)

*Primary Examiner* — An T Nguyen
(74) *Attorney, Agent, or Firm* — McDonnell Boehnen Hulbert & Berghoff LLP

(57) ABSTRACT

A device for controlling alcohol interlock according to an embodiment of the present disclosure includes a sensor for obtaining position information and breath information of a fellow passenger, and a controller that determines whether a blood alcohol concentration of the fellow passenger is measured based on the position information and the breath information of the fellow passenger, and determines whether to re-measure a blood alcohol concentration based on the determination result. Thus, the device may prevent surrogate measurement of the fellow passenger, so that a driver's own blood alcohol concentration may be measured accurately, and drunk driving of a driver may be fundamentally prevented.

16 Claims, 8 Drawing Sheets

(56) References Cited

U.S. PATENT DOCUMENTS

| | | | |
|---|---|---|---|
| 2014/0180500 A1* | 6/2014 | Hannon | B60K 28/063 |
| | | | 701/2 |
| 2016/0185217 A1* | 6/2016 | Hannon | H04K 3/415 |
| | | | 701/99 |
| 2017/0050519 A1* | 2/2017 | Cristofaro | B60W 40/08 |
| 2017/0274768 A1* | 9/2017 | Hok | B60K 28/063 |
| 2019/0202464 A1* | 7/2019 | McGill | B60W 30/182 |

* cited by examiner

DEVICE AND METHOD FOR CONTROLLING ALCOHOL INTERLOCK

CROSS-REFERENCE TO RELATED APPLICATION

This application claims the benefit of priority to Korean Patent Application No. 10-2019-0164179, filed in the Korean Intellectual Property Office on Dec. 10, 2019, the entire contents of which are incorporated herein by reference.

TECHNICAL FIELD

The present disclosure relates to a device and a method for controlling alcohol interlock.

BACKGROUND

Occurrence of traffic accidents due to drunk driving is increasing, so that punishments and crackdowns on the drunk driving has been strengthened to prevent the drunk driving. Despite such countermeasures, it is difficult to prevent drunk driving. Thus, recently, an alcohol interlock device that measures a blood alcohol concentration of a driver in a vehicle and fundamentally prevents driving of the vehicle when alcohol is detected has been developed.

However, in a state in which the measurement of the driver's blood alcohol concentration is not easy by an external environment, due to abnormal measurement of the driver or surrogate measurement of a fellow passenger, accurate measurement of the driver's own blood alcohol concentration is difficult. Thus, there are limitations in prevention of the drunk driving.

SUMMARY

The present disclosure has been made to solve the above-mentioned problems occurring in the prior art while advantages achieved by the prior art are maintained intact.

An aspect of the present disclosure provides a device and method for controlling alcohol interlock that prevent surrogate measurement of a fellow passenger, so that driver's own blood alcohol concentration may be measured accurately. The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a device for controlling alcohol interlock includes a sensor for obtaining position information and breath information of a fellow passenger, and a controller that determines whether a blood alcohol concentration of the fellow passenger is measured based on the position information and the breath information of the fellow passenger, and determines whether to re-measure a blood alcohol concentration based on the determination result.

In one embodiment, the sensor may obtain the position information of the fellow passenger based on sensing values output from a plurality of regions included in a sensible region.

In one embodiment, the sensor may obtain the position information of the fellow passenger based on a chest movement of the fellow passenger and an occurrence region of a vibration of a body surface of the fellow passenger.

In one embodiment, the controller may determine that the fellow passenger is sensed in a driver region when it is determined that the fellow passenger has left a fellow passenger region based on the sensing values output from the plurality of regions.

In one embodiment, the controller may determine that the fellow passenger has invaded the driver region when it is determined that the fellow passenger is sensed in the driver region.

In one embodiment, the sensor may obtain chest movement information of the fellow passenger, and obtain the breath information including a magnitude of breath and a period of the breath based on the chest movement information of the fellow passenger.

In one embodiment, the controller may determine that the fellow passenger measured the blood alcohol concentration when the fellow passenger has invaded the driver region and both the magnitude of the breath and the period of the breath of the fellow passenger exceed a reference value.

In one embodiment, the reference value may include an average value of a magnitude of the breath and an average value of a period of the breath.

According to another aspect of the present disclosure, a method for controlling alcohol interlock includes obtaining position information and breath information of a fellow passenger, and determining whether a blood alcohol concentration of the fellow passenger is measured based on the position information and the breath information of the fellow passenger, and determining whether to re-measure a blood alcohol concentration based on the determination result.

In one embodiment, the obtaining of the position information of the fellow passenger may include obtaining the position information of the fellow passenger based on sensing values output from a plurality of regions included in a sensible region.

In one embodiment, the obtaining of the position information of the fellow passenger may include obtaining the position information of the fellow passenger based on a chest movement of the fellow passenger and an occurrence region of a vibration of a body surface of the fellow passenger.

In one embodiment, the determining of whether the blood alcohol concentration of the fellow passenger is measured may include determining that the fellow passenger is sensed in a driver region when it is determined that the fellow passenger has left a fellow passenger region based on the sensing values output from the plurality of regions.

In one embodiment, the determining of whether the blood alcohol concentration of the fellow passenger is measured may include determining that the fellow passenger has invaded the driver region when it is determined that the fellow passenger is sensed in the driver region.

In one embodiment, the obtaining of the breath information of the fellow passenger may include obtaining chest movement information of the fellow passenger, and obtaining the breath information including a magnitude of breath and a period of the breath based on the chest movement information of the fellow passenger.

In one embodiment, the determining of whether the blood alcohol concentration of the fellow passenger is measured may include determining that the fellow passenger measured the blood alcohol concentration when the fellow passenger has invaded the driver region and both the magnitude of the breath and the period of the breath of the fellow passenger exceed a reference value.

In one embodiment, the reference value may include an average value of a magnitude of the breath and an average value of a period of the breath.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
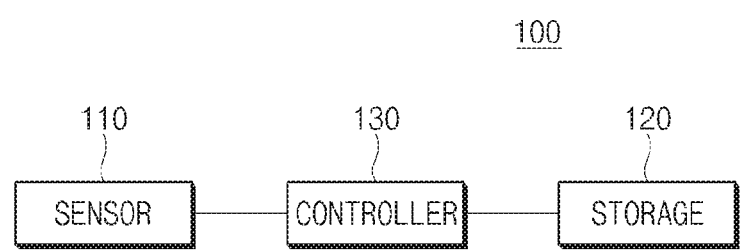
FIG. 1 is a view illustrating a configuration of an alcohol interlock controlling device according to one embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a view illustrating a configuration of an alcohol interlock controlling device according to one embodiment of the present disclosure.

As shown in FIG. 1, an alcohol interlock controlling device 100 may include a sensor 110, storage 120, and a controller 130. In some embodiments, the alcohol interlock controlling device 100 may be located in front of driver region (e.g., on the steering wheel, dash board, etc.).

The sensor 110 may obtain position information and breath information of a fellow passenger. According to an embodiment, the sensor 110 may obtain the position information of the fellow passenger with respect to a sensible region (FOV, Field Of View) including a driver region and a fellow passenger region. In this connection, the sensible region includes a region where a passenger who may input exhalation to a measuring device for measuring a blood alcohol concentration may be positioned. The passenger may include a driver and the fellow passenger. According to an embodiment, the sensible region may include a front seat and a rear seat of a vehicle. To this end, the sensor 110 may include a ROA (Rear Occupant Alert). In some embodiments, the sensor 110 may be located in front of driver region (e.g., on the steering wheel, dash board, etc.).

A more detailed description will be described with reference to FIGS. 2 and 3.

Figure 2:
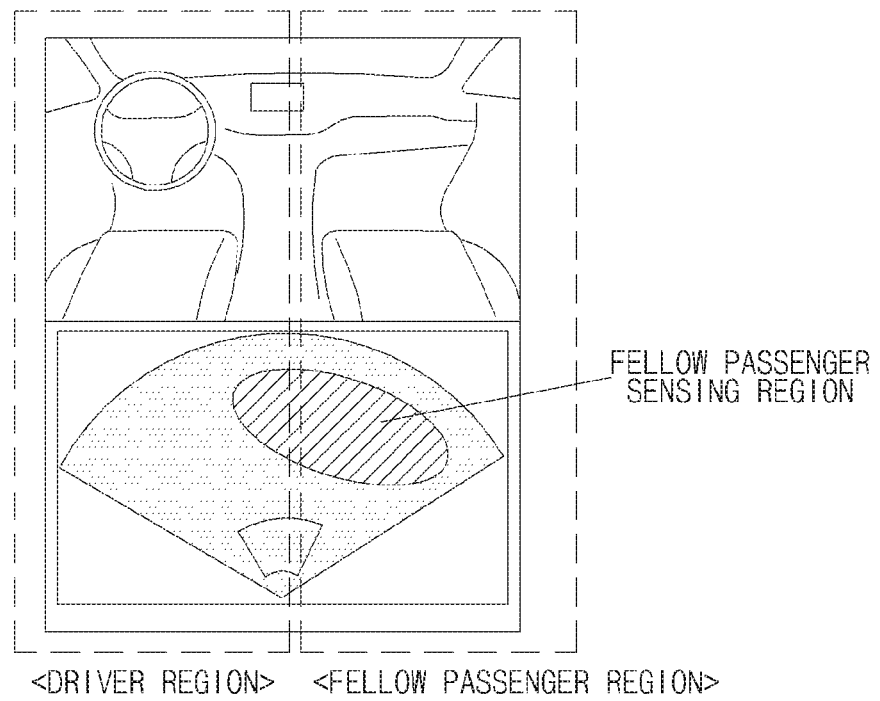
FIG. 2 is a view illustrating a sensed position of a fellow passenger according to one embodiment of the present disclosure.
Figure 3A:
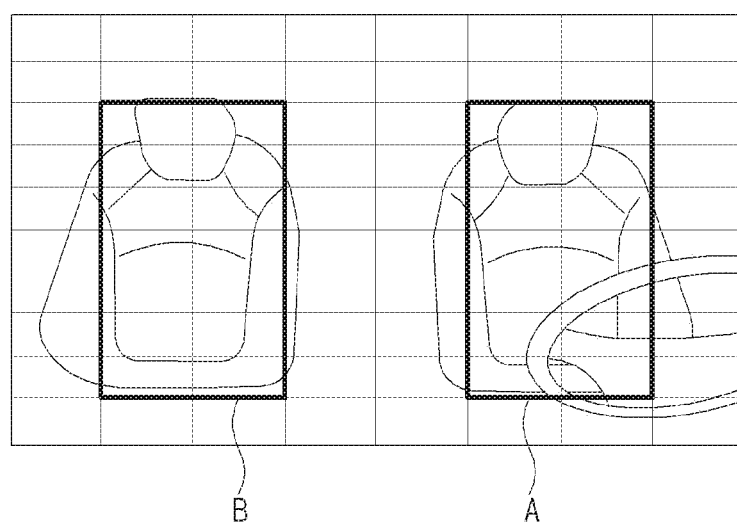
FIGS. 3A and 3B are views illustrating a position sensing region of a fellow passenger according to one embodiment of the present disclosure.
Figure 3B:
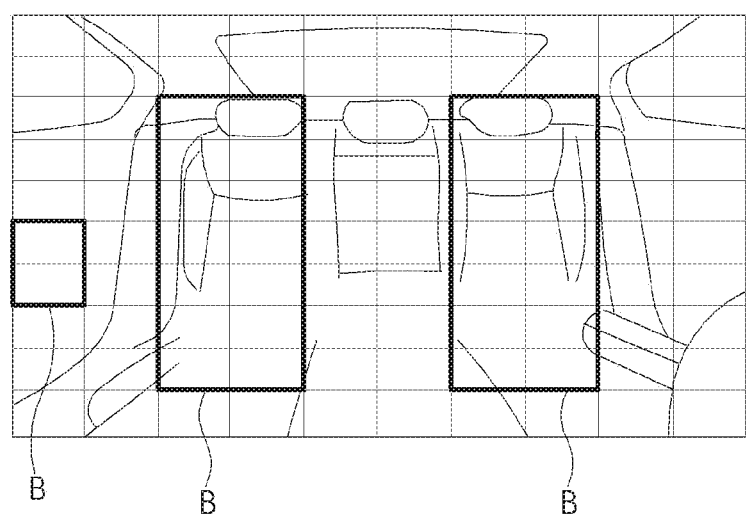

FIG. 2 is a view illustrating a sensed position of a fellow passenger according to one embodiment of the present disclosure, and FIGS. 3A and 3B are views illustrating a position sensing region of a fellow passenger according to one embodiment of the present disclosure.

As shown in FIG. 2, the sensor 110 may obtain the position information of the fellow passenger in the sensible region including the driver region and the fellow passenger region. Further, the controller 130 may determine whether the fellow passenger has invaded the driver region based on the position information of the fellow passenger obtained by the sensor 110. According to an embodiment, when it is determined that the fellow passenger is sensed in the driver region, the controller 130 may determine that the fellow passenger has invaded the driver region.

As shown in FIGS. 3A and 3B, the sensor 110 may output sensing values in a plurality of regions to obtain the position information of the fellow passenger. According to an embodiment, the sensor 110 may include a plurality of Txs (transmitters) and Rxs (receivers) to output the sensing values in the plurality of regions. In this connection, the Tx may transmit a radar signal, and the Rx may receive the radar signal. However, the signals output from the Tx and the Rx may not be limited to the radar signals, and may be replaced by signals used to sense objects.

More specifically, as shown in FIGS. 3A and 3B, the controller 130 may divide a region the sensor 110 is able to sense into a plurality of regions, and set a driver region A and a fellow passenger region B for the plurality of regions. Further, the controller 130 may determine whether the fellow passenger has left the fellow passenger region B based on sensing values output from the plurality of regions by the sensor 110. In this connection, the driver region may include a region where the driver boards and moves, and the fellow passenger region may include a region where the fellow passenger boards and moves.

When the objects are sensed in the plurality of regions, the sensor 110 may output a sensing value lower than a sensing value output when the objects are not sensed. When a sensing value of the fellow passenger region B is increased and a sensing value of a region around the driver region A is lowered, the controller 130 may determine that the fellow passenger is leaving the fellow passenger region B, and may determine that the fellow passenger is sensed around the driver region A using the same.

In addition, the sensor 110 may sense a movement of a chest by breath of the fellow passenger sensed in the fellow passenger region B, and may sense an occurrence of vibration of a body surface by the breath. In addition, the sensor 110 may detect a position where the movement of the chest is occurred and a position where the vibration of the body surface is occurred by the breath. The controller 130 may obtain the position information of the fellow passenger based on a region in which the movement of the chest of the fellow passenger and the vibration of the body surface of the fellow passenger are occurred among the plurality of regions. When it is determined that the position where the movement of the chest of the fellow passenger is occurred and the position where the vibration of the body surface is occurred by the breath are around the driver region A, the controller 130 may determine that the fellow passenger has left the fellow passenger region B, and may determine that the fellow passenger is sensed around the driver region A. That is, the controller 130 may determine that the fellow passenger has invaded the driver region.

The sensor 110 may sense chest movement information of the fellow passenger. According to an embodiment, the sensor 110 may obtain breath information including a magnitude and a period of the breath based on the chest movement information of the fellow passenger. The controller 130 may calculate an average value of the fellow passenger breaths based on the chest movement information of the fellow passenger obtained by the sensor 110.

The storage 120 may store at least one algorithm for performing an operation or execution of various commands for an operation of the alcohol interlock controlling device according to an embodiment of the present disclosure. The storage 120 may include at least one storage medium of a flash memory, a hard disc, a memory card, a read-only memory (ROM), a random access memory (RAM), an electrically erasable programmable read-only memory (EEPROM), a programmable read-only memory (PROM), a magnetic memory, a magnetic disk, and an optical disk.

In addition, the storage 120 may store the sensing value output by the sensor 110 when the object is not sensed, and may store driver region information and fellow passenger region information set among the plurality of regions.

The controller 130 may be implemented by various processing devices, such as a microprocessor with a built-in semiconductor chip capable of performing the operation or the execution of the various commands, and may control overall operations of the alcohol interlock controlling device according to an embodiment of the present disclosure. Specifically, the controller 130 may determine whether a blood alcohol concentration of the fellow passenger is measured based on the position information and the breath information of the fellow passenger obtained by the sensor 110, and may determine whether to re-measure the alcohol concentration based on the determination result. According to an embodiment, the controller 130 may determine the position of the fellow passenger by analyzing the signal output from the Tx of the sensor 110 and received to the Rx via at least three times of reflection.

More specifically, when it is determined that a vehicle door is open, the controller 130 may determine whether there is the passenger in the vehicle and request to input the exhalation of the passenger when there is the passenger. To this end, the controller 130 may output a message of instructing to input the exhalation of the passenger to the blood alcohol concentration measuring device (not shown) through a display (not shown), and may determine whether the exhalation of the passenger is input to the blood alcohol concentration measuring device. When the exhalation of the passenger is input to the blood alcohol concentration measuring device, the controller 130 may measure the blood alcohol concentration based on the input exhalation.

The controller 130 measures the blood alcohol concentration, and determines whether there is the fellow passenger. When the sensor 110 determines that there is the fellow passenger based on the sensed information, the controller 130 determines whether the exhalation of the passenger input to the blood alcohol concentration measuring device is exhalation of the fellow passenger. That is, the controller 130 determines whether the fellow passenger rather than the driver inputs the exhalation. According to an embodiment, the controller 130 may determine whether the fellow passenger inputs the exhalation based on the position information and the breath information of the fellow passenger obtained by the sensor 110.

More specifically, the controller 130 may determine whether the fellow passenger has left the fellow passenger region based on the sensing values obtained from the plurality of regions of the sensible region (FOV) divided by the sensor 110. To this end, the controller 130 may divide the plurality of regions into the driver region and the fellow passenger region, and may determine that the fellow passenger has left the fellow passenger region, and that the fellow passenger is sensed around the driver region when the sensing value of the fellow passenger region increases and the sensing value of the region around the driver region decreases.

In addition, the controller 130 may receive the chest movement information sensed by the breath of the fellow passenger in the fellow passenger region, and vibration occurrence information of the body surface by the breath in the fellow passenger region from the sensor 110, and may determine the position where the movement of the chest of the fellow passenger is occurred and the position where the vibration of the body surface is occurred by the breath. When it is determined that the position where the movement of the chest is occurred and the position where the vibration of the body surface is occurred by the breath are around the driver region, the controller 130 may determine that the fellow passenger has left the fellow passenger region, and determine that the fellow passenger is sensed around the driver region. That is, the controller 130 may determine that the fellow passenger has invaded the driver region.

In addition, the controller 130 may determine whether the breath of the fellow passenger has changed based on the chest movement information of the fellow passenger sensed by the sensor 110. A more detailed description will be achieved with reference to FIG. 4.

Figure 4A:
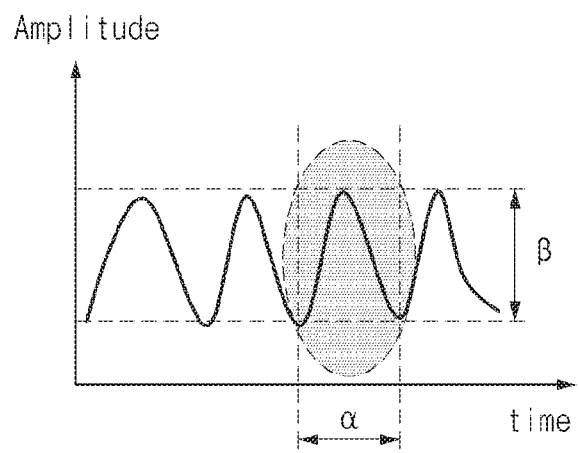
FIGS. 4A and 4B are signal graphs showing breath of a fellow passenger according to one embodiment of the present disclosure.
Figure 4B:
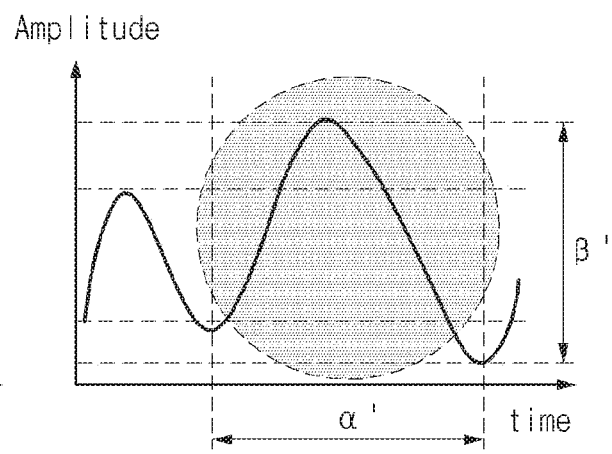

FIGS. 4A and 4B are signal graphs showing breath of a fellow passenger according to one embodiment of the present disclosure.

As shown in FIG. 4A, the controller 130 may calculate an average value α of periods of the breath and an average value β of magnitudes of the breath based on the chest movement information of the fellow passenger. In this connection, the controller 130 may calculate the average value of the periods of the breath and the average value of the magnitudes of the breath based on the chest movement information of the fellow passenger collected for a predetermined time after the fellow passenger boards and before obtaining the input of the exhalation of the passenger for the blood alcohol concentration measurement.

As shown in FIG. 4B, the sensor 110 may sense a period α' of the breath and a magnitude β' of the breath based on the chest movement information of the fellow passenger when obtaining the exhalation of the passenger input for the blood alcohol concentration measurement. Further, the controller 130 may determine that the period α' of the breath of the fellow passenger exceeds the average value α of the periods of the breath, and may determine that the magnitude β' of the breath exceeds the average value β of the magnitudes of the breath. As such, when it is determined that the period α' of the breath of the fellow passenger exceeds the average value α of the periods of the breath and the magnitude β' of the breath of the fellow passenger exceeds the average value β of the magnitudes of the breath, the controller 130 may determine that average breath of the fellow passenger has changed, and may determine that the exhalation of the fellow passenger rather than exhalation of the driver is input when obtaining the input of the exhalation of the passenger for the blood alcohol concentration measurement.

When it is determined that the fellow passenger inputs the exhalation, the controller 130 may ignore the measurement result of the blood alcohol concentration and control to re-measure the alcohol concentration. According to an embodiment, the controller 130 may output a message of instructing to re-input the exhalation of the passenger to the blood alcohol concentration measuring device (not shown) through the display (not shown).

When there is no fellow passenger, the controller 130 may determine that the exhalation input to the blood alcohol concentration measuring device is input by the driver, and may determine the blood alcohol concentration to determine whether the driver is drunk. In addition, even when there is the fellow passenger, when the fellow passenger does not intrude into the driver region and the breath of the fellow passenger has not changed, the controller 130 may determine that the exhalation of the fellow passenger is not input, thereby determining that the exhalation input to the blood alcohol concentration measuring device is input by the driver.

The controller 130 determines whether the driver is drunk. When determining that the driver is drunk, the controller 130 may control the vehicle so as not to be started. In addition, when determining that the driver is not drunk, the controller 130 may control the vehicle to be started.

Figure 5:
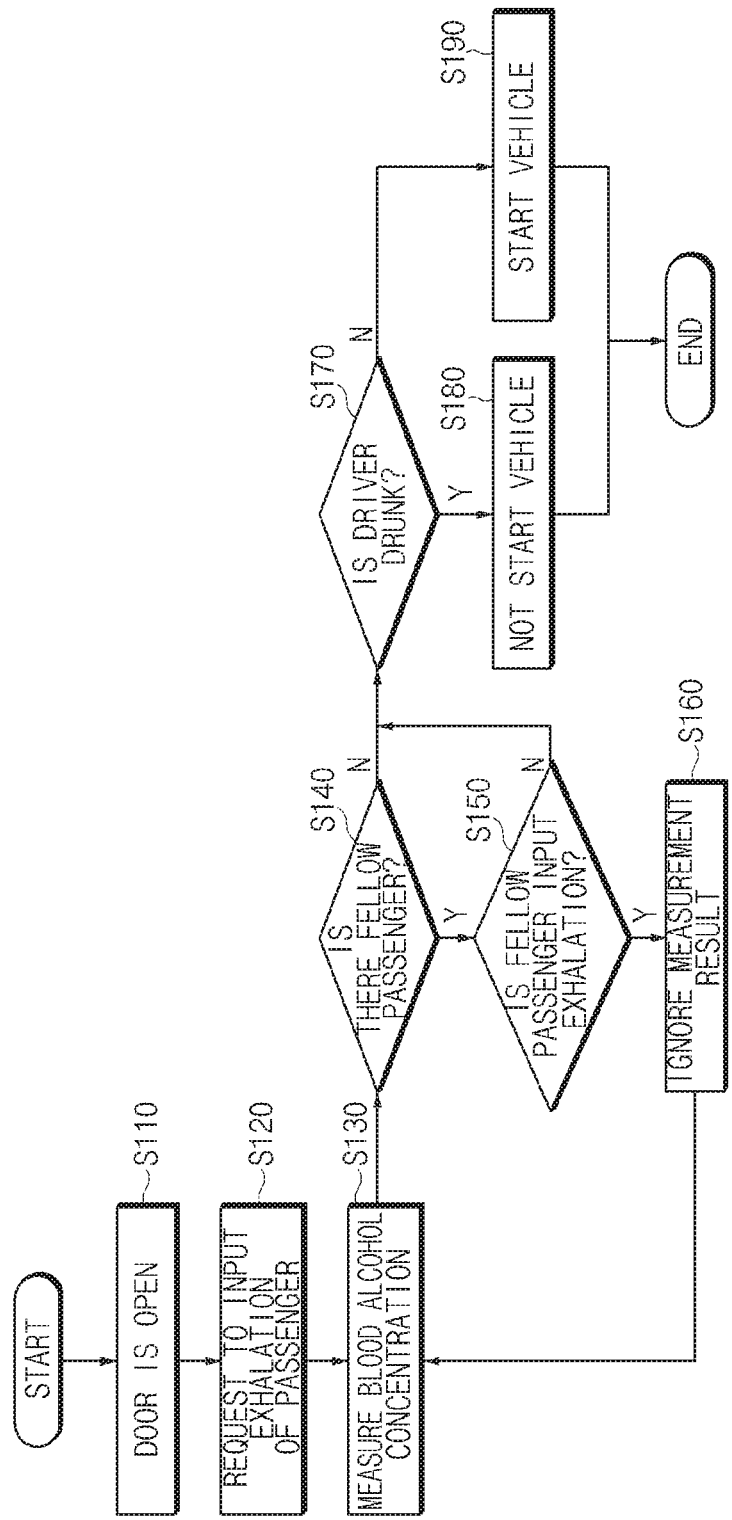
FIG. 5 is a flowchart illustrating a method for controlling alcohol interlock according to one embodiment of the present disclosure.

FIG. 5 is a flowchart illustrating a method for controlling alcohol interlock according to one embodiment of the present disclosure.

As shown in FIG. 5, the controller 130 may determine that the door of the vehicle is open (S110), and may request to input the exhalation of the passenger when determining that there is the passenger in the vehicle (S120). In S120, the controller 130 may output the message of instructing to input the exhalation of the passenger to the blood alcohol concentration measuring device (not shown) through the display (not shown). When the exhalation of the passenger is input to the blood alcohol concentration measuring device, the controller 130 may allow the blood alcohol concentration to be measured based on the input exhalation (S130). When determining that the blood alcohol concentration is measured (Y), the controller 130 determines whether there is the fellow passenger (S140).

When it is determined in S140 that there is the fellow passenger (Y), the controller 130 determines whether the exhalation of the passenger input in S130 is the exhalation of the fellow passenger (S150). A detailed description of how the controller 130 determines whether the exhalation of the fellow passenger is input will be described with reference to FIG. 6. When it is determined in S140 that there is no fellow passenger (N), the controller 130 performs S170.

When it is determined in S150 that the fellow passenger input the exhalation (Y), the controller 130 ignores the blood alcohol measurement result in S130 (S160). When it is determined in S150 that the fellow passenger did not input the exhalation (N), the controller 130 may determine that the exhalation of the passenger input in S130 is the exhalation of the driver, and may determine whether the driver is drunk based on the exhalation of the driver (S170).

When it is determined in S170 that the driver is drunk (Y), the controller 130 controls the vehicle not to be started (S180). On the other hand, when it is determined in S170 that the driver 130 is not drunk (N), and when there is the input of the driver, the controller 130 may control the vehicle to be started (S190).

Figure 6:
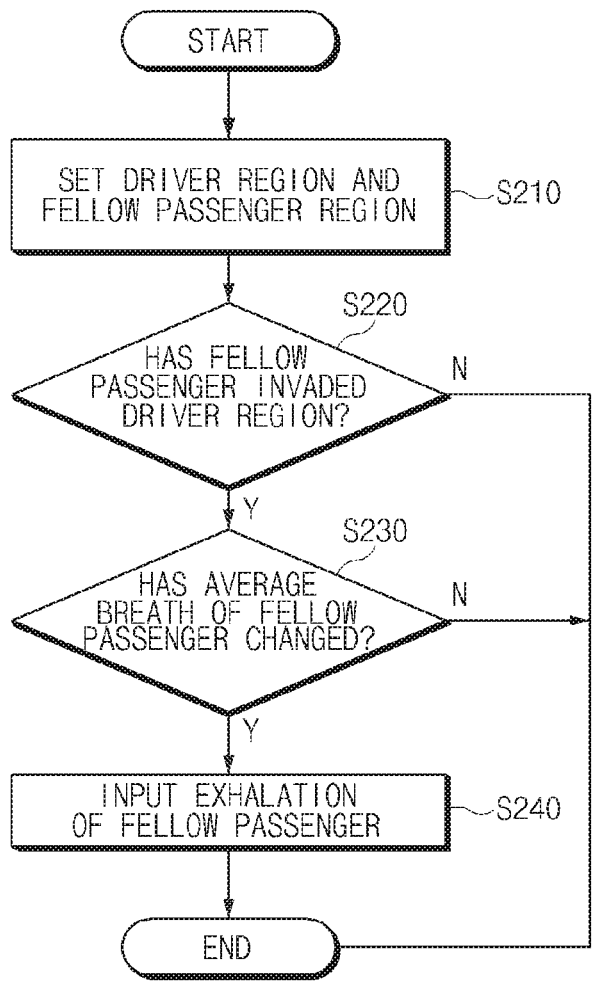
FIG. 6 is a flowchart illustrating a method for determining input of exhalation of a fellow passenger according to one embodiment of the present disclosure.

FIG. 6 is a flowchart illustrating a method for determining input of exhalation of a fellow passenger according to one embodiment of the present disclosure.

As shown in FIG. 6, the controller 130 may allow the sensor 110 to divide the sensible region into the plurality of regions, and set the driver region (A of FIG. 3A) and the fellow passenger region (B of FIGS. 3A and 3B) with respect to the plurality of regions (S210).

The controller 130 may determine whether the fellow passenger has invaded the driver region based on the sensing values obtained by the sensor 110 from the driver region and the fellow passenger region (S220). To this end, in S220, when the sensing value of the fellow passenger region is increased and the sensing value of the region around the driver region is lowered, the controller 130 may determine that the fellow passenger has left the fellow passenger region, and may determine that the fellow passenger is sensed around the driver region, thereby determining that the fellow passenger has invaded the driver region.

In S220, according to another embodiment, the controller 130 may receive the chest movement information sensed by the breath of the fellow passenger in the fellow passenger region and the vibration occurrence information of the body surface by the breath from the sensor 110, and determine the position where the movement of the chest of the fellow passenger occurred and the position where the vibration of the body surface occurred by the breath. When it is determined that the position where the movement of the chest occurred and the position where the vibration of the body surface occurred by the breath are around the driver region, the controller 130 may determine that the fellow passenger has left the fellow passenger region, and determine that the fellow passenger is sensed around the driver region. That is, the controller 130 may determine that the fellow passenger has invaded the driver region.

When it is determined in S220 that the fellow passenger has invaded the driver region (Y), the controller 130 determines whether the breath of the fellow passenger has changed (S230).

In S230, the controller 130 may determine whether the average breath of the fellow passenger has changed based on the chest movement information of the fellow passenger sensed by the sensor 110. To this end, the controller 130 may calculate the average value α of the periods of the breath and the average value β of the magnitudes of the breath based on the chest movement information of the fellow passenger collected for the predetermined time after the fellow passenger boards and before obtaining the input of the exhalation of the passenger for the blood alcohol concentration measurement. In addition, the sensor 110 may sense the period α' of the breath and the size 13' of the breath based on the chest movement information of the fellow passenger when obtaining the exhalation of the passenger input for the blood alcohol concentration measurement. Further, when it is determined that the period α' of the breath of the fellow passenger exceeds the average value α of the periods of the breath and the magnitude β' of the breath of the fellow passenger exceeds the average value β of the magnitudes of the breath, the controller 130 may determine that average breath of the fellow passenger has changed.

When it is determined in S230 that the average breath of the fellow passenger has changed (Y), the controller 130 may determine that the exhalation of the fellow passenger is input to the blood alcohol concentration measuring device (S240).

Figure 7:
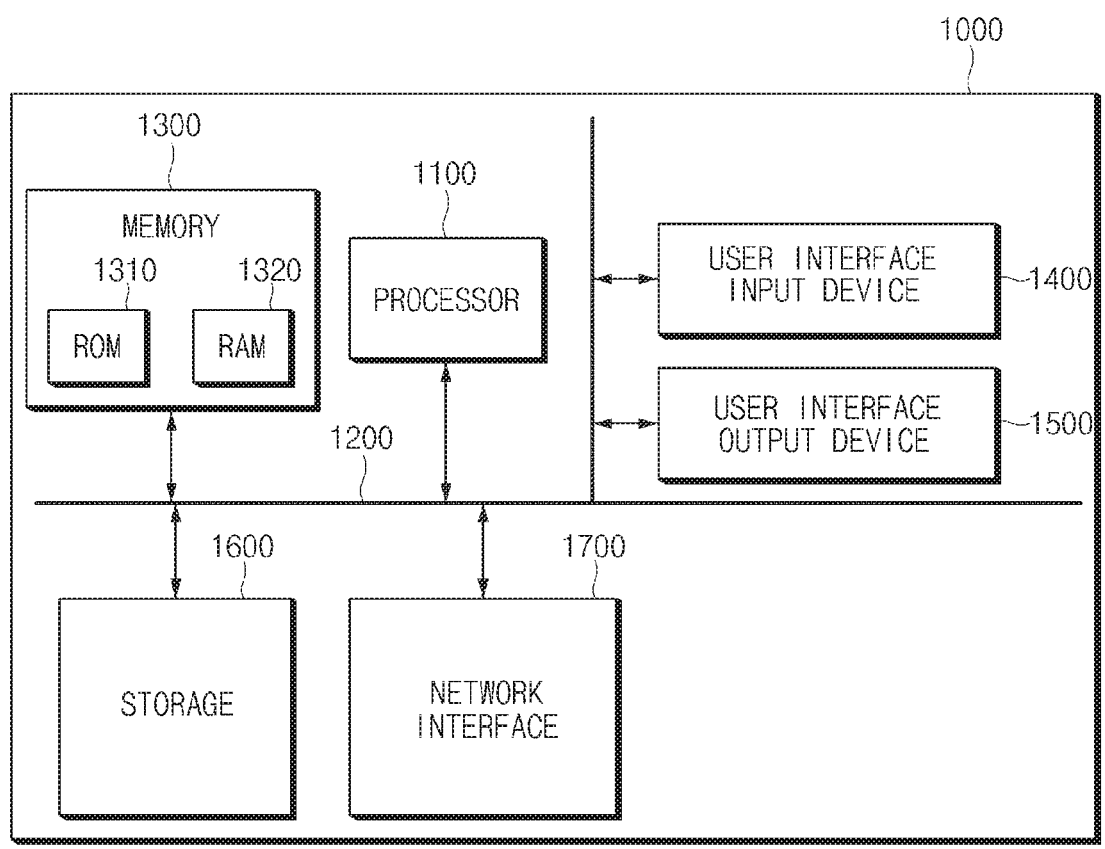
FIG. 7 is a diagram illustrating a configuration of a computing system that executes a method according to one embodiment of the present disclosure.

FIG. 7 illustrates a computing system in which a method according to an embodiment of the present disclosure is implemented.

With reference to FIG. 7, a computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in a hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, a CD-ROM. The exemplar)/storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure.

Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

The device and the method for controlling the alcohol interlock according to an embodiment of the present disclosure may prevent the surrogate measurement of the fellow passenger, so that the driver's own blood alcohol concentration may be detected accurately, and further the drunk driving of the driver may be fundamentally prevented.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device for controlling alcohol interlock, the device comprising:
   a sensor for obtaining position information and breath information of a fellow passenger; and
   a controller configured to:
   determine whether a blood alcohol concentration of the fellow passenger is measured based on the position information and the breath information of the fellow passenger; and
   determine whether to re-measure a blood alcohol concentration based on the determination result.

2. The device of claim 1, wherein the sensor obtains the position information of the fellow passenger based on sensing values output from a plurality of regions included in a sensible region.

3. The device of claim 2, wherein the sensor obtains the position information of the fellow passenger based on a chest movement of the fellow passenger and an occurrence region of a vibration of a body surface of the fellow passenger.

4. The device of claim 3, wherein the controller is configured to determine that the fellow passenger is sensed in a driver region when it is determined that the fellow passenger has left a fellow passenger region based on the sensing values output from the plurality of regions.

5. The device of claim 4, wherein the controller is configured to determine that the fellow passenger has invaded the driver region when it is determined that the fellow passenger is sensed in the driver region.

6. The device of claim 5, wherein the sensor obtains chest movement information of the fellow passenger, and obtains the breath information including a magnitude of breath and a period of the breath based on the chest movement information of the fellow passenger.

7. The device of claim 6, wherein the controller is configured to determine that the fellow passenger measured the blood alcohol concentration when the fellow passenger has invaded the driver region and both the magnitude of the breath and the period of the breath of the fellow passenger exceed a reference value.

8. The device of claim 7, wherein the reference value includes an average value of a magnitude of the breath and an average value of a period of the breath.

9. A method for controlling alcohol interlock, the method comprising:
   obtaining position information and breath information of a fellow passenger; and
   determining whether a blood alcohol concentration of the fellow passenger is measured based on the position information and the breath information of the fellow passenger, and determining whether to re-measure a blood alcohol concentration based on the determination result.

10. The method of claim 9, wherein the obtaining of the position information of the fellow passenger includes:
    obtaining the position information of the fellow passenger based on sensing values output from a plurality of regions included in a sensible region.

11. The method of claim 10, wherein the obtaining of the position information of the fellow passenger includes:

obtaining the position information of the fellow passenger based on a chest movement of the fellow passenger and an occurrence region of a vibration of a body surface of the fellow passenger.

12. The method of claim 11, wherein the determining of whether the blood alcohol concentration of the fellow passenger is measured includes:

determining that the fellow passenger is sensed in a driver region when it is determined that the fellow passenger has left a fellow passenger region based on the sensing values output from the plurality of regions.

13. The method of claim 12, wherein the determining of whether the blood alcohol concentration of the fellow passenger is measured includes:

determining that the fellow passenger has invaded the driver region when it is determined that the fellow passenger is sensed in the driver region.

14. The method of claim 13, wherein the obtaining of the breath information of the fellow passenger includes:

obtaining chest movement information of the fellow passenger, and obtaining the breath information including a magnitude of breath and a period of the breath based on the chest movement information of the fellow passenger.

15. The method of claim 14, wherein the determining of whether the blood alcohol concentration of the fellow passenger is measured includes:

determining that the fellow passenger measured the blood alcohol concentration when the fellow passenger has invaded the driver region and both the magnitude of the breath and the period of the breath of the fellow passenger exceed a reference value.

16. The method of claim 15, wherein the reference value includes an average value of a magnitude of the breath and an average value of a period of the breath.

* * * * *